United States Patent
Liu et al.

(10) Patent No.: US 11,716,020 B2
(45) Date of Patent: Aug. 1, 2023

(54) SCC-BASED DC-DC POWER CONVERSION SYSTEM CAPABLE OF RECEIVING SWITCHING CONTROL ADJUSTABLE BY OUTPUT VOLTAGE THEREOF, AND POWER CONVERSION METHOD THEREOF

(71) Applicant: RICHTEK TECHNOLOGY CORP., Hsinchu County (TW)

(72) Inventors: Kuo-Chi Liu, Hsinchu (TW); Ta-Yung Yang, Taoyuan (TW); Chung-Lung Pai, Hsinchu (TW)

(73) Assignee: RICHTEK TECHNOLOGY CORP., Hsinchu County (TW)

( * ) Notice: Subject to any disclaimer, the term of this patent is extended or adjusted under 35 U.S.C. 154(b) by 69 days.

(21) Appl. No.: 17/511,607

(22) Filed: Oct. 27, 2021

(65) Prior Publication Data

US 2022/0352816 A1    Nov. 3, 2022

Related U.S. Application Data

(60) Provisional application No. 63/183,066, filed on May 3, 2021.

(30) Foreign Application Priority Data

Sep. 8, 2021    (TW) .................................. 110133382

(51) Int. Cl.
*H02M 3/07* (2006.01)
*H02M 1/00* (2006.01)
*H02M 3/00* (2006.01)

(52) U.S. Cl.
CPC ........... *H02M 3/07* (2013.01); *H02M 1/0012* (2021.05); *H02M 3/01* (2021.05)

(58) Field of Classification Search
CPC ............................................... H02M 3/07–078
See application file for complete search history.

(56) References Cited

U.S. PATENT DOCUMENTS

| | | | |
|---|---|---|---|
| 7,026,800 B2 | 4/2006 | Liu | |
| 2011/0050315 A1 | 3/2011 | Beier | |
| 2020/0186028 A1* | 6/2020 | Cheng | ..................... H02M 3/07 |
| 2022/0060100 A1* | 2/2022 | Huang | ..................... H02M 3/01 |

FOREIGN PATENT DOCUMENTS

| | | |
|---|---|---|
| CN | 201430532 Y | 3/2010 |
| JP | 2012-139048 | 7/2012 |
| TW | 201711360 A | 3/2017 |

* cited by examiner

*Primary Examiner* — Peter M Novak
(74) *Attorney, Agent, or Firm* — Winston Hsu

(57) ABSTRACT

A DC-DC power conversion system includes a resonant switched-capacitor converter and a controller. The resonant switched-capacitor converter is switched between a first state and a second state to generate an output voltage, and includes an input terminal, a resonant tank, an output capacitor, a first set of switches and a second set of switches. The input terminal is used to receive an input voltage. The output capacitor is used to generate the output voltage. The first set of switches is turned on in the first state and turned off in the second state according to a first control signal. The second set of switches is turned on in the second state and turned off in the first state according to a second control signal. The controller adjusts the first control signal and the second control signal according to the output voltage.

12 Claims, 10 Drawing Sheets

SCC-BASED DC-DC POWER CONVERSION SYSTEM CAPABLE OF RECEIVING SWITCHING CONTROL ADJUSTABLE BY OUTPUT VOLTAGE THEREOF, AND POWER CONVERSION METHOD THEREOF

CROSS REFERENCE TO RELATED APPLICATIONS

This non-provisional application claims priority of U.S. provisional application No. 63/183,066, filed on 3 May 2021, and Taiwan patent application No. 110133382, filed on 8 Sep. 2021, included herein by reference in its entirety.

BACKGROUND OF THE INVENTION

1. Field of the Invention

The present invention relates to electronic circuits, and in particular, to a switched-capacitor converter (SCC)-based DC-DC power conversion system capable of receiving switching control adjustable by an output voltage thereof, and a power conversion method thereof.

2. Description of the Prior Art

A direct current-direct current (DC-DC) converter is a device commonly used in mobile devices such as mobile phones and notebook computers for converting a DC voltage into different DC voltages, so as to provide power. A switched-capacitor converter (SCC) or a resonant switched-capacitor converter (RSCC) is a DC-DC converter consuming no or a small amount of power during power transfer.

The resonant switched-capacitor converter converts an input voltage to an output voltage using a fixed conversion ratio. When the input voltage is too large, the resonant switched-capacitor converter still generates an excessively large output voltage by the fixed conversion ratio, resulting in damage to an electronic device.

In the related art, an additional bulk converter is adopted to limit the input voltage of the resonant switched-capacitor converter, so as to control the output voltage of the resonant switched-capacitor converter. However, the buck converter takes up a large circuit area, resulting in increased manufacturing costs.

SUMMARY OF THE INVENTION

According to an embodiment of the invention, a DC-DC power conversion system includes an input terminal, a resonant switched-capacitor converter, an output terminal and a controller. The input terminal is configured to receive an input voltage. The resonant switched-capacitor converter is used to receive the input voltage and is switched between a first state and a second state to generate an output voltage. The resonant switched-capacitor converter includes a first resonant tank, an output capacitor, a first set of switches and a second set of switches. The output capacitor has a first terminal used to generate the output voltage; and a second terminal coupled to a ground terminal. The first set of switches is coupled to the first resonant tank and the output capacitor, and is used to be turned on in the first state and turned off in the second state according to a first control signal. The second set of switches is coupled to the first resonant tank and the output capacitor, and is used to be turned on in the second state and turned off in the first state according to a second control signal. The output terminal is coupled to the output capacitor, and is used to output the output voltage. The controller is coupled to the first set of switches and the second set of switches, and is used to adjust the first control signal according to the output voltage to control a first ON time of the first set of switches, and adjust the second control signal according to the output voltage to control a second ON time of the second set of switches.

According to another embodiment of the invention, a DC-DC power conversion system includes a resonant switched-capacitor converter and a controller. The resonant switched-capacitor converter includes a first resonant tank, an output capacitor, a first set of switches coupled to the first resonant tank and the output capacitor, and a second set of switches coupled to the first resonant tank and the output capacitor. A power conversion method for use in the DC-DC power conversion system includes the resonant switched-capacitor converter switching between a first state and a second state to generate an output voltage, the controller adjusting a first control signal and a second control signal according to the output voltage, turning on the first set of switches for a first ON time in the first state according to the first control signal, and turning on the second set of switches for a second ON time in the second state according to the second control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
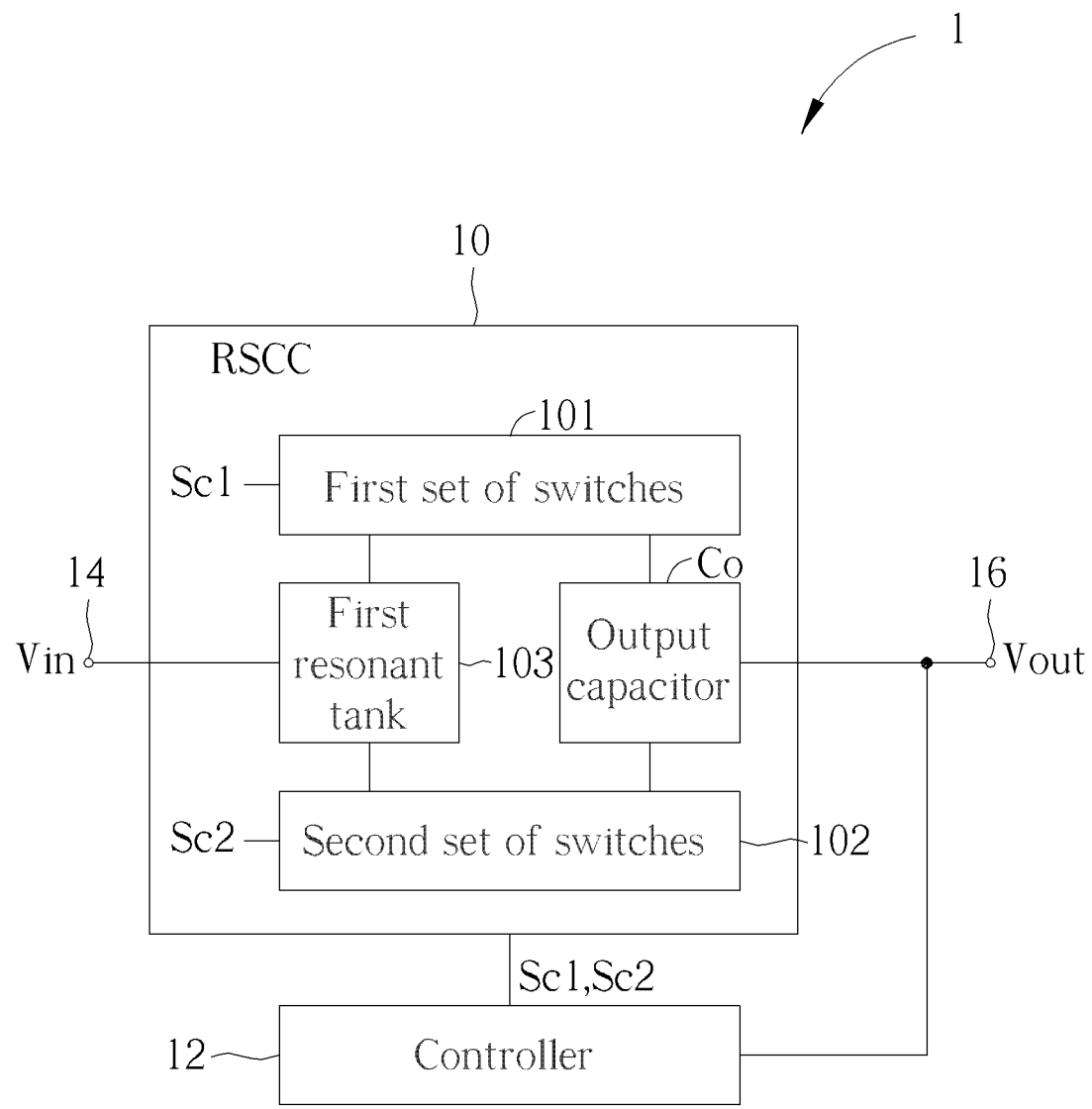
FIG. 1 is a block diagram of a DC-DC power conversion system according to an embodiment of the invention.

FIG. 1 is a block diagram of a DC-DC power conversion system 1 according to an embodiment of the invention. The DC-DC power conversion system 1 employs a resonant switched-capacitor converter (RSCC) to convert an input voltage Vin to an output voltage Vout, and to regulate the output voltage Vout at a fixed level without using a bulk converter, so as to provide overvoltage protection without significantly increasing the circuit area. The input voltage Vin and the output voltage Vout are DC voltages, and the output voltage Vout may be greater than or less than the input voltage Vin. In some embodiments, the DC-DC power conversion system 1 may down-convert the input voltage Vin to generate the output voltage Vout, and the ratio of the input voltage Vin to the output voltage Vout may be greater than 2:1. For example, the ratio of the input voltage Vin to the output voltage Vout may be 4 to 1. When the input voltage Vin exceeds 60V, the output voltage Vout may still be maintained below 13V.

The DC-DC power conversion system 1 includes a resonant switched-capacitor converter (RSCC) 10, a controller 12, an input terminal 14 and an output terminal 16. The controller 12 may repeatedly and alternately switch the RSCC 10 between the first state and the second state. The RSCC 10 may receive the input voltage Vin and switch between the first state and the second state to generate the output voltage Vout.

The RSCC 10 may include a first resonant tank 103, an output capacitor Co, a first set of switches 101, and a second set of switches 102. The input terminal 14 may receive the input voltage Vin from a preceding capacitor or a preceding circuit. The first resonant tank 103 may receive the input voltage Vin from the input terminal 14 and generate a sinusoidal voltage and a sinusoidal current, achieving zero current switching and reducing a power loss of the RSCC 10. The first set of switches 101 may be coupled to the first resonant tank 103 and the output capacitor Co, and may be turned on in the first state and turned off in the second state according to the first control signal Sc1. The second set of switches 102 may be coupled to the first resonant tank 103 and the output capacitor Co, and may be turned on in the second state and turned off in the first state according to the second control signal Sc2. The first set of switches 101 and the second set of switches 102 may respectively control coupling between the first resonant tank 103 and the output capacitor Co in the first state and the second state according to the first control signal Sc1 and the second control signal Sc2, for the output capacitor Co to provide the output voltage Vout. In some embodiments, in the first state, the first set of switches 101 may couple the first resonant tank 103 between the input terminal 14 and the output capacitor Co. In the second state, the second set of switches 102 may couple the resonant tank 103 and the output capacitor Co in parallel. The output terminal 16 may be coupled to the output capacitor Co, and may output the output voltage Vout to a subsequent circuit such as a central processing unit.

The controller 12 is coupled to the first set of switches 101 and the second set of switches 102, and may adjust the first control signal Sc1 according to the output voltage Vout in a steady state to control the first ON time of the first set of switches 101, adjust the second control signal Sc2 according to the output voltage Vout in the steady state to control the second ON time of the second set of switches 102, thereby generating the output voltage Vout.

While FIG. 1 shows a specific circuit configuration of the RSCC 10, the RSCC 10 may include other circuit components and may be configured in any other manner in other embodiments. For example, the first resonant tank 103 may be further coupled to the output capacitor Co, the first set of switches 101 and the second set of switches 102 may not be directly coupled to the output capacitor Co, and other circuit configuration remains similar to FIG. 1.

Figure 2:
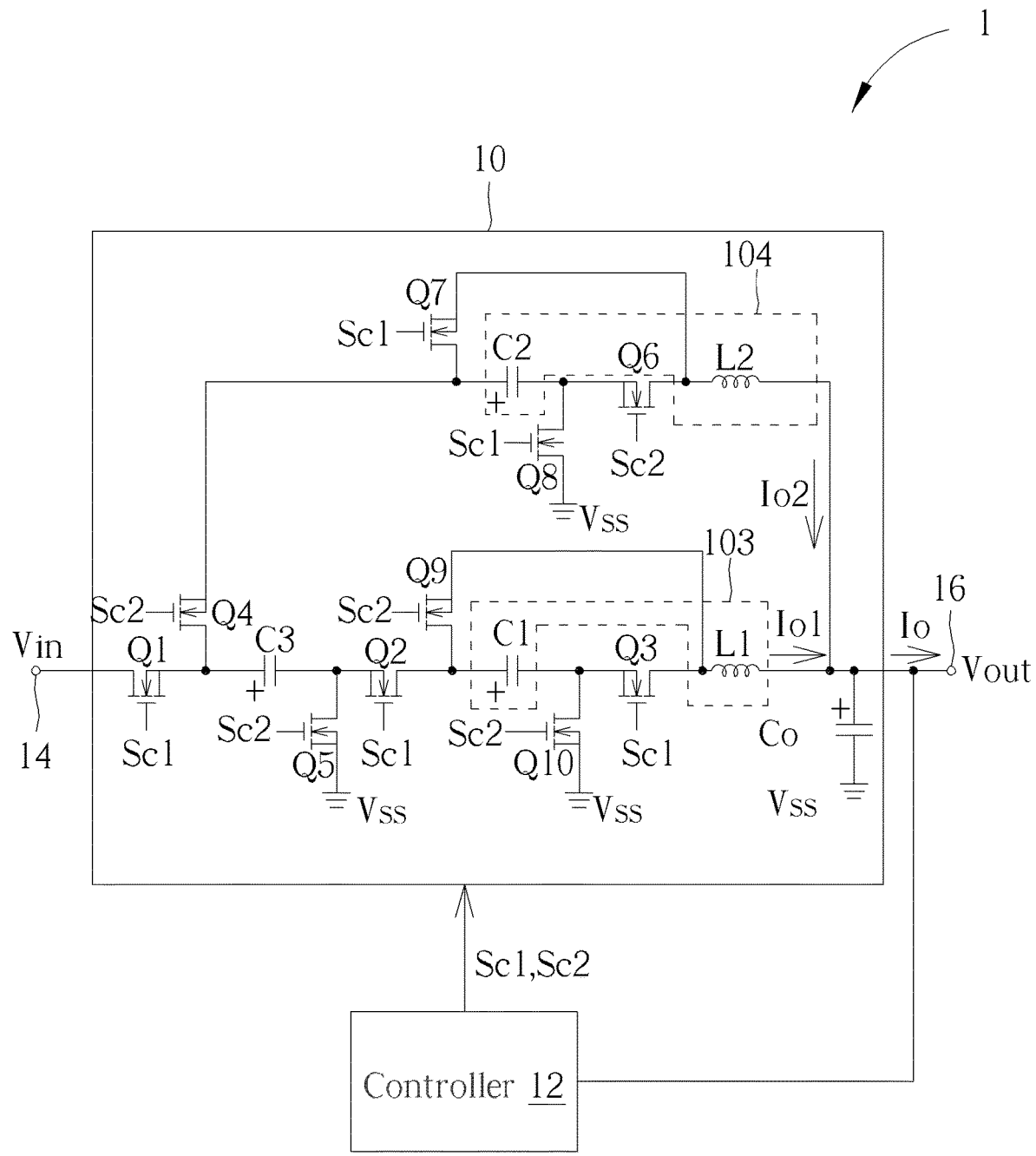
FIG. 2 is a schematic diagram of the DC-DC power conversion system in FIG. 1.

FIG. 2 is a schematic diagram of the DC-DC power conversion system 1. In FIG. 2, the RSCC 10 may provide a voltage conversion ratio of 4 to 1, and has a rated input voltage ranging between 48V and 60V, and the output voltage Vout may be maintained below 13V. The RSCC 10 includes a storage capacitor C3, a first resonant tank 103, a second resonant tank 104, an output capacitor Co, and transistors Q1 to Q10. The transistors Q1 to Q10 may be, but are not limited to, N-type metal-oxide-semiconductor field-effect transistors (MOSFET).

The first resonant tank 103 includes a first resonant capacitor C1 and a first resonant inductor L1. The first resonant capacitor C1 has a first terminal and a second terminal. The first resonant inductor L1 has a first terminal; and a second terminal coupled to the first terminal of the output capacitor Co. The second resonance tank 104 includes a second resonant capacitor C2 and a second resonant inductor L2. The second resonant capacitor C2 has a first terminal and a second terminal. The second resonant inductor L2 has a first terminal; and a second terminal coupled to the first terminal of the output capacitor Co. The output capacitor Co has a first terminal configured to generate the output voltage Vout; and a second terminal coupled to a ground terminal. The ground terminal can provide a ground voltage Vss such as 0V.

The transistors Q1 to Q3, Q7 and Q8 may form the first set of switches 101. The transistor Q1 has a first terminal coupled to the input terminal 14; a second terminal; and a control terminal configured to receive the first control signal Sc1. The transistor Q2 has a first terminal; a second terminal coupled to the first terminal of the first resonant capacitor C1; and a control terminal configured to receive the first control signal Sc1. The transistor Q3 has a first terminal coupled to the second terminal of the first resonant capacitor C1; a second terminal coupled to the first terminal of the first resonant inductor L1; and a control terminal configured to receive the first control signal Sc1. The transistor Q7 has a first terminal coupled to the first terminal of the second resonant inductor L2; a second terminal coupled to the first terminal of the second resonant capacitor C2; and a control terminal configured to receive the first control signal Sc1. The transistor Q8 has a first terminal coupled to the second terminal of the second resonant capacitor C2; a second terminal coupled to the ground terminal; and a control terminal configured to receive the first control signal Sc1.

The transistors Q4 to Q6, Q9 and Q10 may form a second set of switches 102. The transistor Q4 has a first terminal coupled to the first terminal of the second resonant capacitor C2; a second terminal coupled to the first terminal of the storage capacitor C3; and a control terminal configured to receive the second control signal Sc2. The transistor Q5 has a first terminal coupled to the second terminal of the storage capacitor C3; a second terminal coupled to the ground terminal; and a control terminal configured to receive the second control signal Sc2. The transistor Q6 has a first terminal coupled to the second terminal of the second resonant capacitor C2; a second terminal coupled to the first terminal of the second resonant inductor L2; and a control terminal configured to receive the second control signal Sc2. The transistor Q9 has a first terminal coupled to the first terminal of the first resonant inductor L1; a second terminal coupled to the first terminal of the first resonant capacitor C1; and a control terminal configured to receive the second control signal Sc2. The transistor Q10 has a first terminal coupled to the second terminal of the first resonant capacitor C1; a second terminal coupled to the ground terminal; and a control terminal configured to receive the second control signal Sc2.

In operation, the first resonant tank 103 and the second resonant tank 104 provide a voltage conversion ratio of 2 to 1, respectively, and the input voltage Vin may be 4 times the output voltage Vout. The voltage across the storage capacitor C3 may be twice the output voltage Vout. The voltages across the first resonant capacitor C1, the second resonant capacitor C2, and the output capacitor Co may be substantially identical to the output voltage Vout, and therefore, the RSCC 10 provides a voltage conversion ratio of 4 to 1.

In the first state, the first set of switches 101 and the second set of switches 102 may be configured to couple the first terminal of the storage capacitor C3 to the input terminal 14, couple the first terminal of the first resonant capacitor C1 to the second terminal of the storage capacitor C3, couple the second terminal of the first resonant capacitor C1 to the first terminal of the first resonant inductor L1, couple the first terminal of the second resonant capacitor C2 to the first terminal of the second resonant inductor L2, and couple the second terminal of the second resonant capacitor C2 to the ground terminal. In such a configuration, the first resonant capacitor C1 may charge the output capacitor Co, and the second resonant capacitor C2 may discharge the output capacitor Co.

In the second state, the first set of switches 101 and the second set of switches 102 may be configured to couple the first terminal of the second resonant inductor L2 to the second terminal of the second resonant capacitor C2, couple the first terminal of the storage capacitor C3 to the first terminal of the second resonant capacitor C2, and couple the second terminal of the storage capacitor C3 to the ground terminal. In such a configuration, the first resonant capacitor C1 may discharge the output capacitor Co, and the second resonant capacitor C2 may charge the output capacitor Co.

The RSCC 10 may alternately switch between the first state and the second state to continuously charge and discharge all capacitors in the RSCC 10 to maintain a charge balance, while transferring power from the input terminal 14 to the output terminal 16 to generate the output voltage Vout. In order to achieve the charge balance of all capacitors in the RSCC 10, the controller 12 may adjust a duty cycle of the first control signal Sc1 and a duty cycle of the second control signal Sc2 to be equal, for the first resonant tank 103 and the second resonant tank 104 to generate a sinusoidal current Io1 and a sinusoidal current Io2 that are opposite in phase and identical in averaged magnitude. Further, the current Io1 and the current Io2 are both half (Io/2) of the output current Io of the RSCC 10 in the first state and the second state.

The controller 12 may adjust the first control signal Sc1 according to the output voltage Vout to control a first ON time and a first OFF time of the first set of switches 101, and adjust the second control signal Sc2 according to the output voltage Vout to control a second ON time and a second OFF time of the second set of switches 102. For example, when the output voltage Vout is less than an upper limit of the output voltage (e.g., 13V), the controller 12 may adjust the first control signal Sc1 to approach 50% of the duty cycle, and therefore, the first ON time of the first set of switches 101 is substantially equal to the first OFF time of the first set of switches 101. Similarly, the controller 12 may adjust the second control signal Sc2 to approach 50% duty cycle, and therefore, the second ON time of the second set of switches 102 is substantially equal to the second OFF time of the second set of switches 102. In this manner, the RSCC 10 may generate the output voltage Vout as ¼ of the input voltage Vin. When the output voltage Vout exceeds the upper limit of the output voltage, the controller 12 may adjust the first control signal Sc1 to be less than 50% duty cycle, and therefore, the first ON time of the first set of switches 101 is less than the first OFF time of the first set of switches 101. Similarly, the second control signal Sc2 is adjusted to be less than 50% of the duty cycle, and therefore, the second ON time of the second set of switches 102 is less than the second OFF time of the second set of switches 102. In this manner, the RSCC 10 may regulate the output voltage Vout to be less than the upper limit to provide the overvoltage protection. When the output voltage Vout significantly exceeds 13V, the controller 12 may adjust the first control signal Sc1 and the second control signal Sc2 to approach 0% duty cycle, so as to turn off the RSCC 10 and provide the overvoltage protection. The first ON time and the second ON time are non-overlapping, the length of the first ON time may be equal to the length of the second ON time, and the length of the first OFF time may be equal to the length of the second OFF time.

In some embodiments, at power-up, the first ON time and the second ON time may be equal to a predetermined ON time, and gradually increase from the predetermined ON time to the ON time in the steady state. The predetermined ON time may be significantly less than a 50% duty cycle of the first control signal Sc1 and the second control signal Sc2. For example, the predetermined ON time may be 0% duty cycle of the first control signal Sc1 and the second control signal Sc2. At power-up, a voltage spike may occur in the input voltage Vin owing to closing of a power switch. The controller 12 may gradually adjust the first control signal Sc1 and the second control signal Sc2 from 0% duty cycle (the predetermined ON time) to 48% duty cycle (the ON time in the steady state), so as to stabilize the DC-DC power conversion system 1 without being affected by the input voltage Vin at power-up.

The DC-DC power conversion system 1 adjusts the first control signal Sc1 and the second control signal Sc2 according to the output voltage Vout to regulate the output voltage Vout, thereby providing an overvoltage protection without significantly increasing the circuit area.

Figure 3:
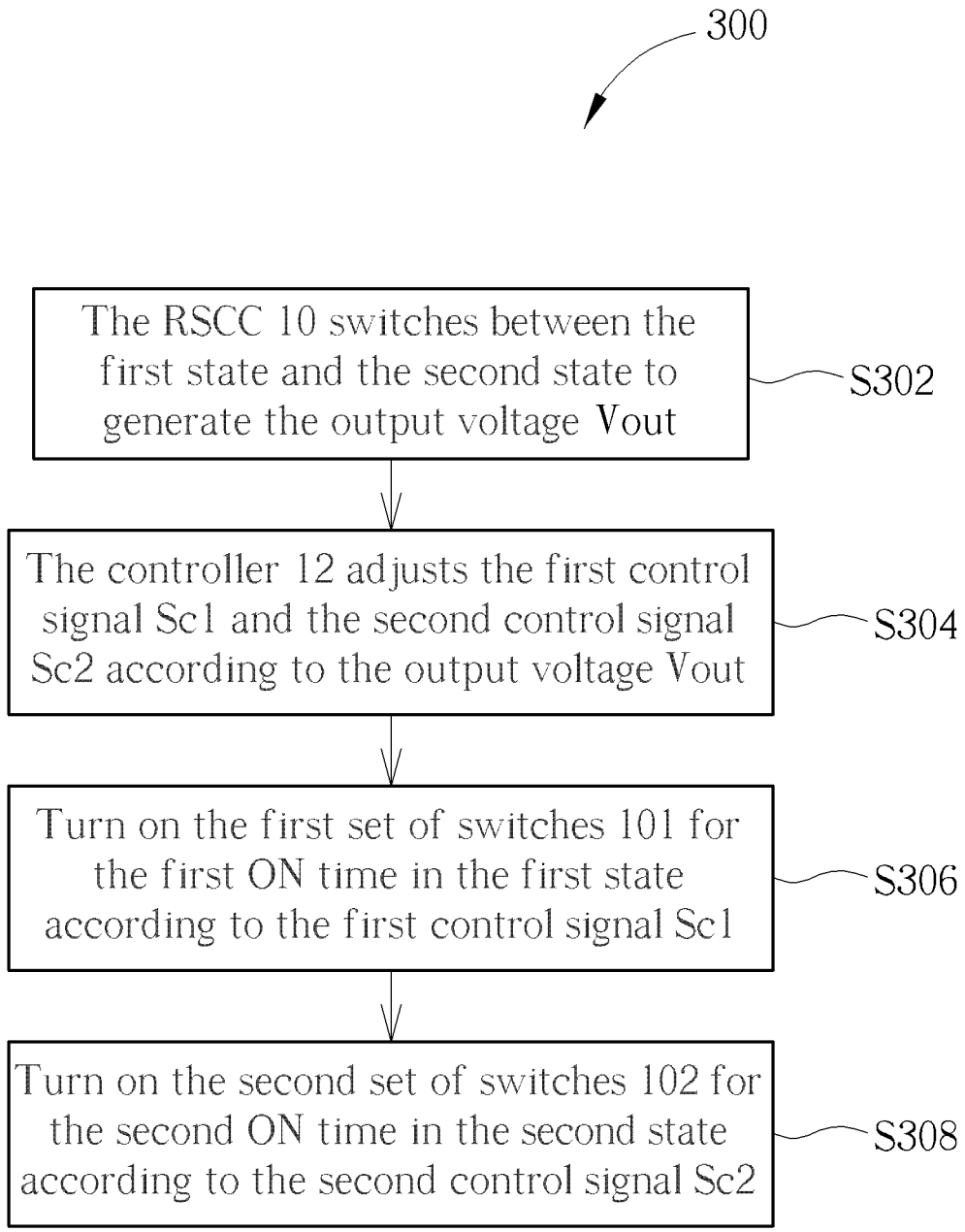
FIG. 3 is a flowchart of a power conversion method of the DC-DC power conversion system in FIG. 1.

FIG. 3 is a flowchart of a power conversion method 300 of the DC-DC power conversion system 1. The power conversion method 300 includes Steps S302 to S308 for regulating the output voltage Vout. Any reasonable step change or adjustment is within the scope of the disclosure. Steps S302 to S308 are detailed as follows:

Step S302: The RSCC 10 switches between the first state and the second state to generate the output voltage Vout;

Step S304: The controller 12 adjusts the first control signal Sc1 and the second control signal Sc2 according to the output voltage Vout;

Step S306: Turn on the first set of switches 101 for the first ON time in the first state according to the first control signal Sc1;

Step S308: Turn on the second set of switches 102 for the second ON time in the second state according to the second control signal Sc2.

The details of the power conversion method 300 can be found in the preceding paragraph, and will not be repeated here.

Figure 4:
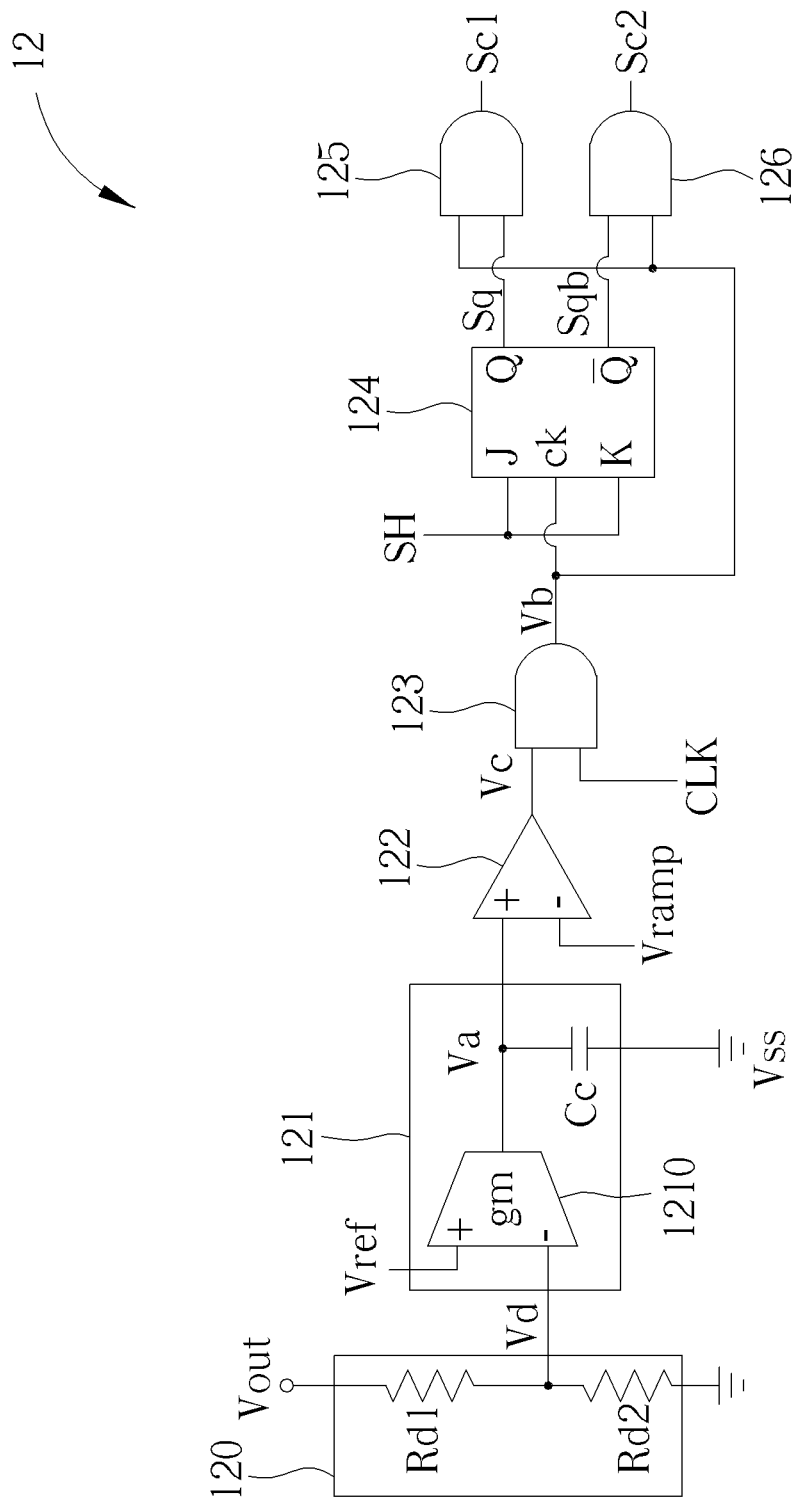
FIG. 4 is a circuit schematic of the controller in FIG. 1.

FIG. 4 is a circuit schematic of the controller 12. The controller 12 includes a voltage divider 120, a first comparison circuit 121, a second comparison circuit 122, a first AND gate 123, a flip-flop 124, a second AND gate 125 and a third AND gate 126. The voltage divider 120 is coupled to the first terminal of the output capacitor Co, the first comparison circuit 121 is coupled to the voltage divider 120, the second comparison circuit 122 is coupled to the first comparison circuit 121, the first AND gate 123 is coupled to the second comparison circuit 122, the flip-flop 124 is coupled to the first AND gate 123, and the second and third AND gates 125 and 126 are coupled to the flip flop 124.

The voltage divider 120 may receive the output voltage Vout from the first terminal of the output capacitor Co to generate a divided voltage Vd of the output voltage Vout. The voltage divider 120 may include resistors Rd1 and Rd2. The resistor Rd1 includes a first terminal coupled to the first terminal of the output capacitor Co; and a second terminal. The resistor Rd2 includes a first terminal coupled to the second terminal of the resistor Rd1 and configured to provide the divided voltage Vd, and a second terminal coupled to the ground terminal.

The first comparison circuit 121 may compare the divided voltage Vd and a reference voltage Vref to generate a first comparison voltage Va. The reference voltage Vref may correspond to the upper limit of the output voltage of the output voltage Vout. The reference voltage Vref may be set to a fixed voltage level. Increasing the reference voltage Vref may increase the upper limit of the output voltage. The first comparison circuit 121 may include a comparator 1210 and a capacitor Cc. The comparator 1210 includes a non-inverting input terminal configured to receive the reference voltage Vref; an inverting input terminal coupled to the second terminal of the resistor Rd1 and configured to receive the divided voltage Vd; and an output terminal configured to output a comparison current according to a difference between the reference voltage Vref and the divided voltage Vd. The comparator 1210 may have a gain gm. The comparison current may be positively correlated to the difference between the reference voltage Vref and the divided voltage Vd. The capacitor Cc includes a first terminal coupled to the output terminal of the comparator 1210, and a second terminal coupled to the ground terminal. The comparison current may charge the capacitor Cc to generate the first comparison voltage Va. When the divided voltage Vd is less than the reference voltage Vref, the difference between the reference voltage Vref and the divided voltage Vd is positive in value, and the first comparison voltage Va is large. When the divided voltage Vd exceeds the reference voltage Vref, the difference between the reference voltage Vref and the divided voltage Vd is negative in value, and the first comparison voltage Va is small.

The second comparison circuit 122 may compare the first comparison voltage Va and a ramp voltage Vramp to generate a second comparison voltage Vc. The ramp voltage Vramp may be a sawtooth waveform generated by an external signal generator according to the clock signal CLK. The period of the sawtooth waveform and the period of the clock signal CLK may be identical. The second comparison circuit 122 includes a non-inverting input terminal coupled to the first terminal of the capacitor Cc and configured to receive the first comparison voltage Va; an inverting input terminal configured to receive the ramp voltage Vramp; and an output terminal configured to output a second comparison voltage Vc according to a difference between the comparison voltage Va and the ramp voltage Vramp. When the ramp voltage Vramp is less than the first comparison voltage Va, the second comparison voltage Vc may be set to a high logic level. When the ramp voltage Vramp exceeds the first comparison voltage Va, the second comparison voltage Vc may be set to a low logic level.

The first AND gate 123 may perform an AND operation on the second comparison voltage Vc and the clock signal CLK to generate a control signal Vb. The first AND gate 123 may include a first input terminal coupled to the output terminal of the second comparison circuit 122 and configured to receive the second comparison voltage Vc; a second input terminal configured to receive the clock signal CLK; and an output terminal configured to output the control signal Vb. The frequency of the clock signal CLK may be positively correlated to a switching frequency of the first set of switches 101 and the second set of switches 102. For example, the ½ frequency of the clock signal CLK may be the switching frequency of the first set of switches 101 and the second set of switches 102. If the output voltage Vout exceeds the upper limit of the output voltage, the waveforms of the control signal Vb and the second comparison voltage Vc may be identical. If the output voltage Vout is less than the upper limit of the output voltage, the waveforms of the control signal Vb and the clock signal CLK may be identical.

The flip-flop 124 may generate an output signal Sq and an inverted output signal Sqb according to the control signal Vb. The output signal Sq and the inverted output signal Sqb may be opposite in phase. The flip-flop 124 may be a JK flip-flop, including a J input terminal configured to receive a high logic level SH; a K input terminal configured to receive the high logic level SH; a clock input terminal ck coupled to the output terminal of the first AND gate 123 and configured to receive the control signal Vb; an output terminal Q configured to output an output signal Sq; and an inverted output terminal $\overline{Q}$ configured to output an inverted output signal Sqb. The flip-flop 124 may toggle the output signal Sq and the inverted output signal Sqb upon each rising edge of the control signal Vb.

The second AND gate 125 may perform an AND operation on the control signal Vb and the output signal Sq to generate the first control signal Sc1. The third AND gate 126 may perform an AND operation on the control signal Vb and the inverted output signal Sqb to generate the second control signal Sc2.

Figure 5:
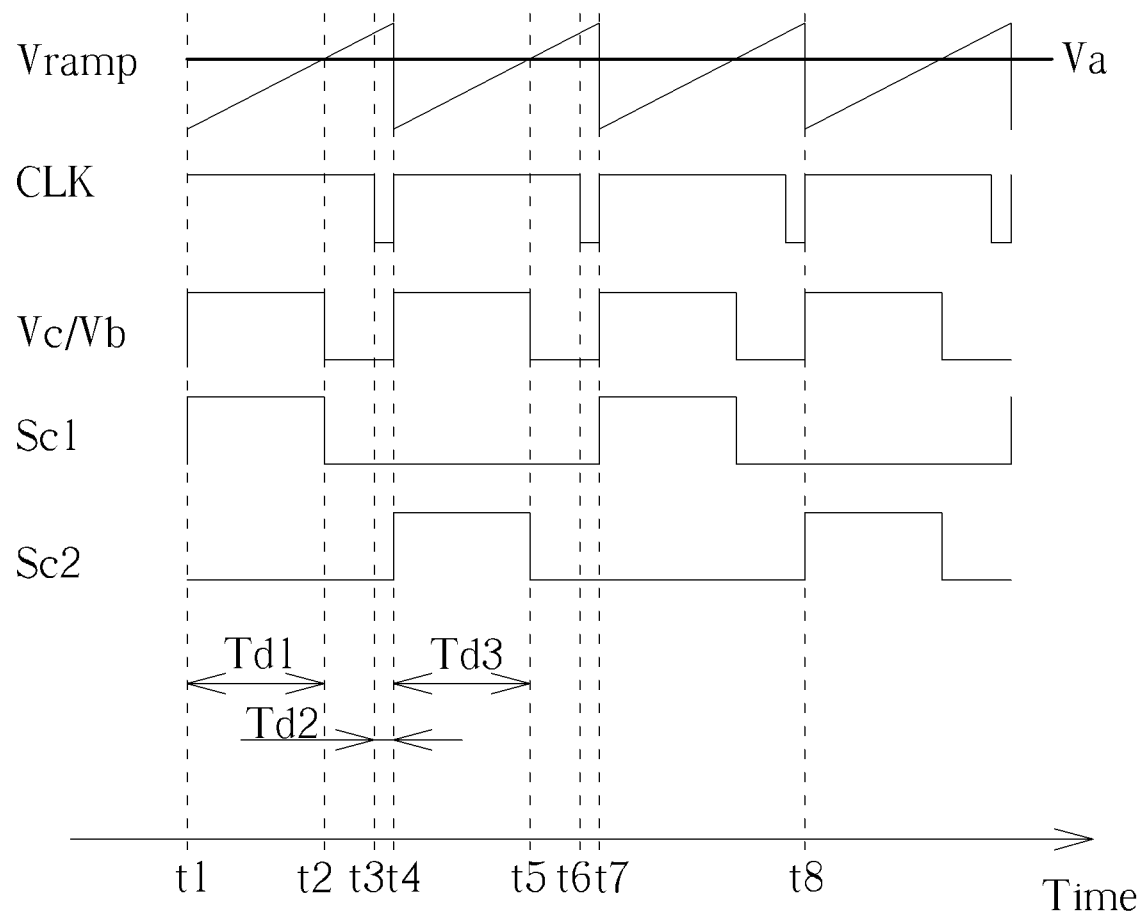
FIG. 5 shows waveforms of the controller in FIG. 4.

The operation of the controller 12 in FIG. 4 is explained below with reference to FIG. 5. FIG. 5 shows waveforms of the controller 12 in FIG. 4, with the divided voltage Vd exceeding the reference voltage Vref. The horizontal axis represents time and the vertical axis represents magnitude of a signal.

Between Time t1 and Time t2, the ramp voltage Vramp is less than the first comparison voltage Va, and the control signal Vb is set to the high logic level. The flip-flop 124 sets the output signal Sq to the high logic level, and sets the inverted output signal Sqb to the low logic level, the second AND gate 125 performs an AND operation on the control signal Vb and the output signal Sq to set the first control signal Sc1 to the high logic level, and the third AND gate 126 performs an AND operation on the control signal Vb and the inverted output signal Sqb to set the second control signal Sc2 to the low logic level. A time interval Td1 between Time t1 and Time t2 may be referred to as the first ON time of the first set of switches 101. When the output voltage Vout exceeds the upper limit of the output voltage, the length of the period Td1 may be decreased with the time interval of the output voltage Vout exceeding the upper limit of the output voltage.

Between Time t2 and Time t4, the ramp voltage Vramp exceeds the first comparison voltage Va, and the control signal Vb is set to the low logic level. The flip-flop 124 maintains the output signal Sq at the high logic level, and maintains the inverted output signal Sqb at the low logic level, the second AND gate 125 performs an AND operation on the control signal Vb and the output signal Sq to set the first control signal Sc1 to the low logic level, and the third AND gate 126 performs an AND operation on the control signal Vb and the inverted output signal Sqb to set the second control signal Sc2 to the low logic level.

Between Time t4 and Time t5, the ramp voltage Vramp is less than the first comparison voltage Va, and the control signal Vb is switched to the high logic level. The flip-flop 124 switches the output signal Sq to the low logic level and switches the inverted output signal Sqb to the high logic level at the rising edge of the control signal Vb, and the second AND gate 125 performs an AND operation on the control signal Vb and the output signal Sq to set the first control signal Sc1 to the low logic level, and the third AND gate 126 performs an AND operation on the control signal Vb and the inverted output signal Sqb to set the second control signal Sc2 to the high logic level. A time interval Td3 between Time t4 and Time t5 may be referred to as the second ON time of the second set of switches 102. When the output voltage Vout exceeds the upper limit of the output voltage, the length of the period Td3 may be decreased with the time interval of the output voltage Vout exceeding the upper limit of the output voltage. The length of the time interval Td3 and the length of the time interval Td1 may be equal.

Between Time t5 and Time t7, the ramp voltage Vramp exceeds the first comparison voltage Va, and the control signal Vb is switched to the low logic level. The flip-flop 124 maintains the output signal Sq at the low logic level, and maintains the inverted output signal Sqb to the high logic level, and the second AND gate 125 performs an AND operation on the control signal Vb and the output signal Sq to set the first control signal Sc1 to the low logic level, and the third AND gate 126 performs an AND operation on the control signal Vb and the inverted output signal Sqb to set the second control signal Sc2 to the low logic level. A time interval between Time t2 and Time t7 may be referred to as the first OFF time of the first set of switches 101.

In this manner, the controller 12 switches the second control signal Sc2 to the high logic level again at Time t8. A time interval between Time t5 and Time t8 may be referred to as the second OFF time of the second set of switches 102.

If the output voltage Vout is less than the upper limit of the output voltage, the divided voltage Vd will be less than the reference voltage Vref, the first comparison voltage Va will exceed the maximum value of the ramp voltage Vramp, the control signal Vc will be maintained at the high logic level, and the second comparison voltage Vc will be maintained at the high logic level, the waveform of the control signal Vb and the waveform of the clock signal CLK will be identical. The first control signal Sc1 is set to the high logic level between Time t1 and Time t3, and set to the low logic level between Time t3 and Time t4. The second control signal Sc2 is set to the high logic level between Time t4 and Time t6, and set to the low logic level between Time t6 and Time t7. Between Time t3 and Time t4 and between Time t6 and Time t7, the first control signal Sc1 and the second control signal Sc2 are set to the low logic levels regardless, thereby ensuring that the first set of switches 101 and the second set of switches 102 will not be turned on simultaneously. A time interval between Time t3 and Time t4 is represented by Td2.

Figure 6:
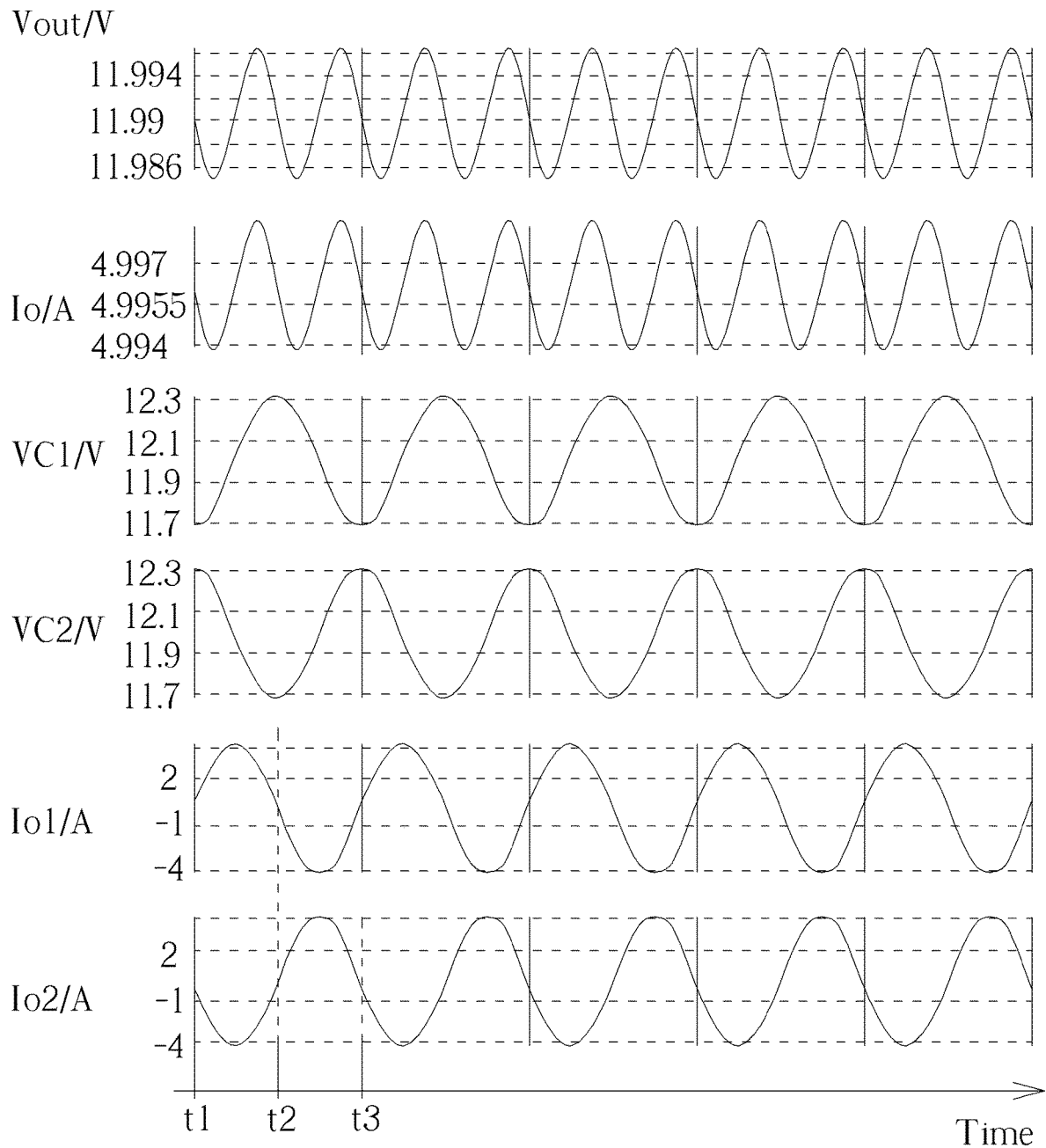
FIG. 6 shows waveforms of the DC-DC power conversion system in FIG. 1 with the first control signal and the second control signal having a substantially 50% duty cycle.
Figure 7:
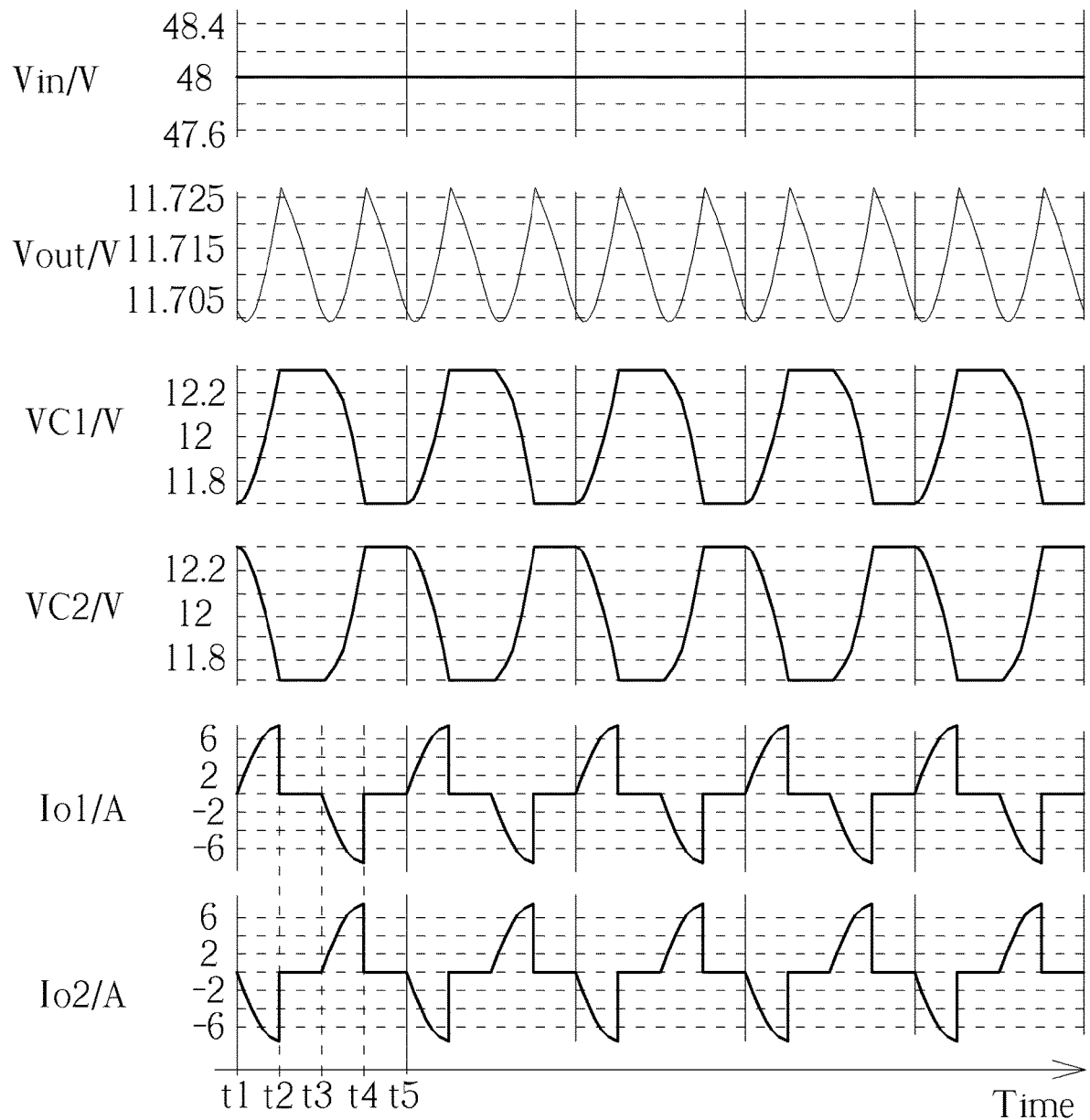
FIG. 7 shows waveforms of the DC-DC power conversion system in FIG. 1 with the first control signal and the second control signal having a substantially 25% duty cycle.

FIG. 6 shows waveforms of the DC-DC power conversion system in FIG. 1 with the first control signal and the second control signal having a substantially 50% duty cycle. FIG. 7 shows waveforms of the DC-DC power conversion system in FIG. 1 with the first control signal and the second control signal having a substantially 25% duty cycle. The simulation environment of FIGS. 6 and 7 includes the DC-DC power conversion system 1 in FIG. 2, an input voltage Vin of 48V, a capacitance of the first resonant capacitor C1 and a capacitance of the second resonant capacitor C2 of 4 uF, a capacitance of and the storage capacitor C3 of 100 uF, an inductance of the first resonant inductor L1 and an inductance of the second resonant inductor L2 of 25 nH, and a switching frequency of 500 kHz for the first set of switches 101 and the second set of switches 102.

When the first control signal Sc1 and the second control signal Sc2 are substantially 50% duty cycle, FIG. 6 shows that the output voltage Vout oscillates about 12V, the output voltage Vout is substantially equal to ¼ of the input voltage Vin, and the peak-to-peak ripple is approximately 0.02V. The output current Io is a sinusoidal current. The voltage VC1 across the first resonant capacitor C1 and the voltage VC2 across the second resonant capacitor C2 are complete sinusoidal voltages and are opposite in phase. The current Io1 and current Io2 are complete sinusoidal currents and are opposite in phase. Between Time t1 and Time t2, the current Io1 charges the output capacitor Co and the current Io2 discharges the output capacitor Co to generate the output voltage Vout. Between Time t2 and Time t3, the current Io1 discharges the output capacitor Co and the current Io2 charges the output capacitor Co to generate the output voltage Vout.

In FIG. 7, the first control signal Sc1 and the second control signal Sc2 are substantially 25% duty cycle, the output voltage Vout oscillates about 11.7V, and the output voltage Vout is less than ¼ of the input voltage Vin. The voltage VC1 across the first resonant capacitor C1 and the voltage VC2 across the second resonant capacitor C2 are partial sinusoidal, partial square voltages and are opposite in phase, and the current Io1 and the current Io2 are partial sinusoidal currents and are opposite in phase. Between Time t1 and Time t2, the current Io1 charges the output capacitor Co and the current Io2 discharges the output capacitor Co to generate the output voltage Vout. Between Time t2 and Time 3, the current Io1 and the current Io2 are 0 A. Between Time t3 and Time t4, the current Io1 discharges the output capacitor Co and the current Io2 charges the output capacitor Co to generate the output voltage Vout. Between Time t4 and Time t5, the current Io1 and the current Io2 are 0 A. Since the current Io1 and the current Io2 are partial sinusoidal currents, the output capacitor Co is partially charged and partially discharged, thereby generating an output voltage Vout less than ¼ of the input voltage Vin.

Figure 8:
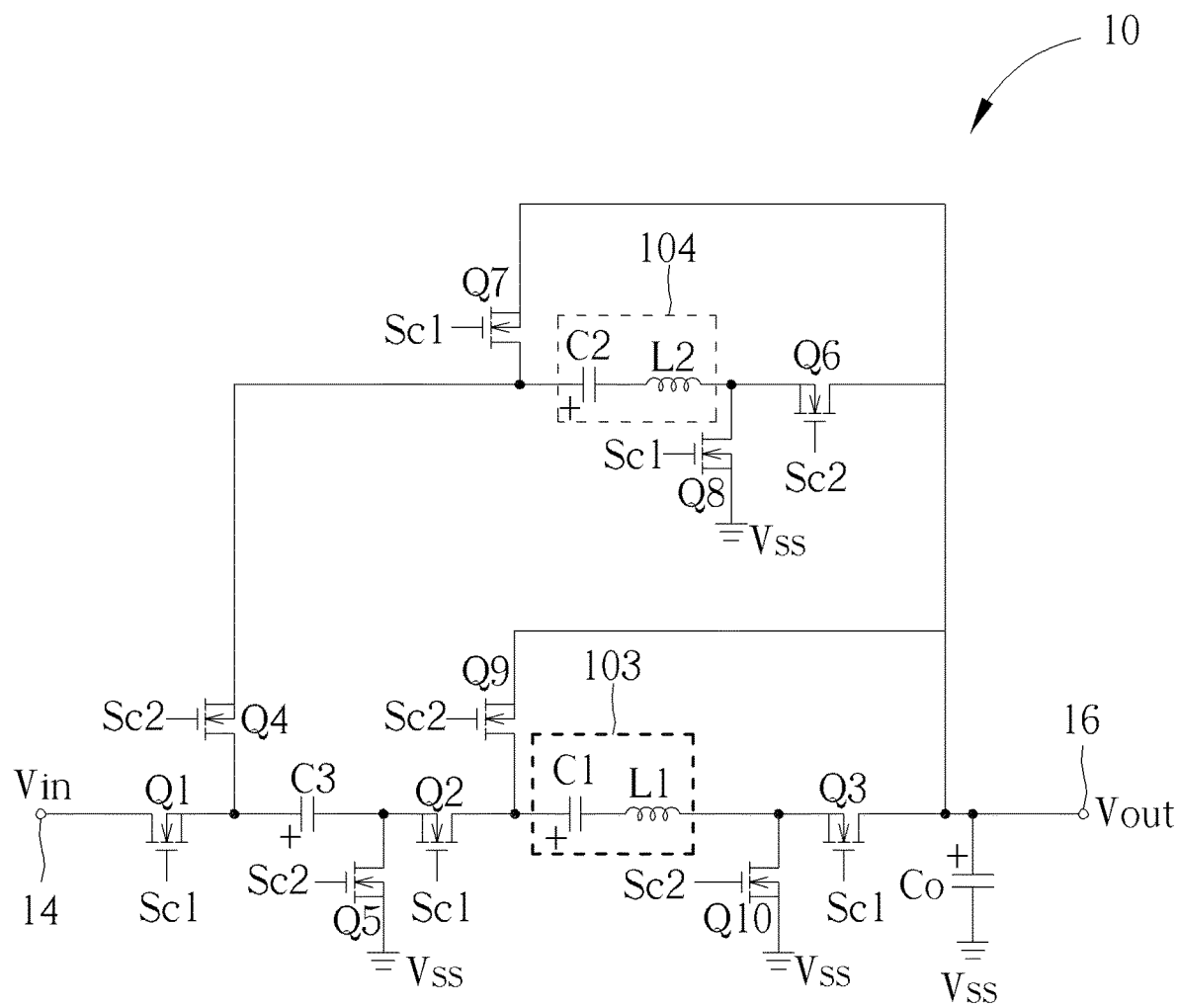
FIG. 8 is a circuit schematic of the resonant switched-capacitor converter according to another embodiment of the invention.

FIG. 8 is a circuit schematic of the resonant switched-capacitor converter 10 according to another embodiment of the invention. The resonant switched-capacitor converters 10 in FIG. 8 and FIG. 2 are different in that in FIG. 8, the first resonant capacitor C1 and the first resonant inductor L1 are directly coupled to each other, the second resonant capacitor C2 and the second resonant inductor L2 are directly coupled to each other, and the first resonant inductor L1 and the second resonant inductor L2 are not directly coupled to the output capacitor Co. The resonant switching capacitor converter 10 in FIG. 8 may replace the resonant switching capacitor converter 10 in FIG. 2.

The first resonant tank 103 includes a first resonant capacitor C1 and a first resonant inductor L1. The first resonant capacitor C1 has a first terminal and a second terminal. The first resonant inductor L1 has a first terminal coupled to the second terminal of the first resonant capacitor C1; and a second terminal. The second resonance tank 104 includes a second resonant capacitor C2 and a second resonant inductor L2. The second resonant capacitor C2 has a first terminal and a second terminal. The second resonant inductor L2 has a first terminal coupled to the second terminal of the second resonant capacitor C2; and a second terminal. The output capacitor Co has a first terminal configured to generate the output voltage Vout; and a second terminal coupled to a ground terminal.

The transistors Q1 to Q3, Q7 and Q8 may form the first set of switches 101. The transistor Q1 has a first terminal coupled to the input terminal 14; a second terminal coupled to the first terminal of the storage capacitor C3; and a control terminal configured to receive the first control signal Sc1. The transistor Q2 has a first terminal coupled to the second terminal of the storage capacitor C3; a second terminal coupled to the first terminal of the first resonant capacitor C1; and a control terminal configured to receive the first control signal Sc1. The transistor Q3 has a first terminal coupled to the second terminal of the first resonant inductor L1; a second terminal coupled to the first terminal of the output capacitor Co; and a control terminal configured to receive the first control signal Sc1. The transistor Q7 has a first terminal coupled to the first terminal of the output capacitor Co; a second terminal coupled to the first terminal of the second resonant capacitor C2; and a control terminal configured to receive the first control signal Sc1. The transistor Q8 has a first terminal coupled to the second terminal of the second resonant inductor L2; a second terminal coupled to the ground terminal; and a control terminal configured to receive the first control signal Sc1.

The transistors Q4 to Q6, Q9 and Q10 may form a second set of switches 102. The transistor Q4 has a first terminal coupled to the first terminal of the second resonant capacitor C2; a second terminal coupled to the first terminal of the storage capacitor C3; and a control terminal configured to receive the second control signal Sc2. The transistor Q5 has a first terminal coupled to the second terminal of the storage capacitor C3; a second terminal coupled to the ground terminal; and a control terminal configured to receive the second control signal Sc2. The transistor Q6 has a first terminal coupled to the second terminal of the second resonant inductor L2; a second terminal coupled to the first terminal of the output capacitor Co; and a control terminal configured to receive the second control signal Sc2. The transistor Q9 has a first terminal coupled to the first terminal of the output capacitor Co; a second terminal coupled to the first terminal of the first resonant capacitor C1; and a control terminal configured to receive the second control signal Sc2. The transistor Q10 has a first terminal coupled to the second terminal of the first resonant inductor L1; a second terminal coupled to the ground terminal; and a control terminal configured to receive the second control signal Sc2.

The operations of the resonant switched-capacitor converters 10 in FIG. 8 and FIG. 2 are similar, and the explanation therefor may be found in the preceding paragraphs, and will not be repeated here.

Figure 9:
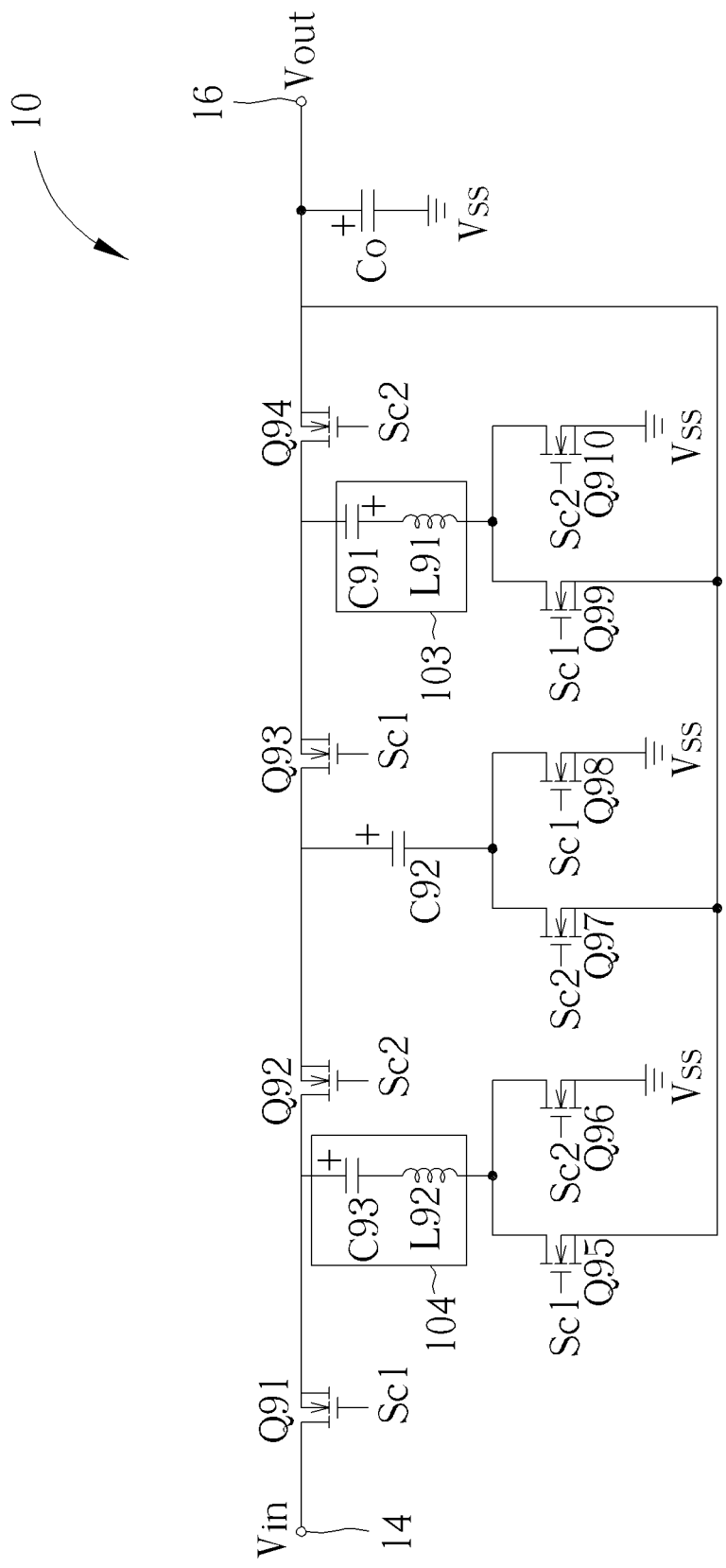
FIG. 9 is a circuit schematic of the resonant switched-capacitor converter according to another embodiment of the invention.

FIG. 9 is a schematic circuit diagram of another resonant switched-capacitor converter 10. The resonant switched-capacitor converter 10 in FIG. 9 may replace the resonant switched-capacitor converter 10 in FIG. 2. In FIG. 9, the RSCC 10 may include a first resonant tank 103, a second resonant tank 104, a storage capacitor C92, an output capacitor Co, and transistors Q91 to Q910. The transistors Q91 to Q910 may be, but are not limited to, N-type MOSFETs.

The first resonant tank 103 includes a first resonant capacitor C91 and a first resonant inductor L91. The first resonant capacitor C91 has a first terminal and a second terminal. The first resonant inductor L91 has a first terminal coupled to the second terminal of the first resonant capacitor C91; and a second terminal. The storage capacitor C92 has a first terminal and a second terminal. The second resonance tank 104 includes a second resonant capacitor C93 and a second resonant inductor L92. The second resonant capacitor C93 has a first terminal and a second terminal. The second resonant inductor L92 has a first terminal coupled to the second terminal of the second resonant capacitor C93; and a second terminal. The output capacitor Co has a first terminal configured to generate an output voltage Vout, and a second terminal.

The transistors Q91, Q93, Q95, Q98, and Q99 may form a first set of switches 101. The transistor Q91 has a first terminal coupled to the input terminal 14; a second terminal coupled to the first terminal of the second resonant capacitor C93; and a control terminal configured to receive the first control signal Sc1. The transistor Q93 has a first terminal coupled to the first terminal of the storage capacitor C92; a second terminal coupled to the first terminal of the first resonant capacitor C91; and a control terminal configured to receive the first control signal Sc1. The transistor Q95 has a first terminal coupled to the second terminal of the second resonant inductor L92; a second terminal coupled to the first terminal of the output capacitor Co; and a control terminal configured to receive the first control signal Sc1. The transistor Q98 has a first terminal coupled to the second terminal of the storage capacitor C92; a second terminal coupled to the ground terminal; and a control terminal configured to receive the first control signal Sc1. The transistor Q99 has a first terminal coupled to the second terminal of the first resonant inductor L91; a second terminal coupled to the first terminal of the output capacitor Co; and a control terminal configured to receive the first control signal Sc1.

The transistors Q92, Q94, Q96, Q97 and Q910 may form a second set of switches 102. The transistor Q92 has a first terminal coupled to the first terminal of the second resonant capacitor C93; a second terminal coupled to the first terminal of the storage capacitor C92; and a control terminal configured to receive the second control signal Sc2. The transistor Q94 has a first terminal coupled to the first terminal of the first resonant capacitor C91; a second terminal coupled to the first terminal of the output capacitor Co; and a control terminal configured to receive the second control signal Sc2. The transistor Q96 has a first terminal coupled to the second terminal of the second resonant inductor L92; a second terminal coupled to the ground terminal; and a control terminal configured to receive the second control signal Sc2. The transistor Q97 has a first terminal coupled to the second terminal of the storage capacitor C92; a second terminal coupled to the first terminal of the output capacitor Co; and a control terminal configured to receive the second control signal Sc2. The transistor Q910 has a first terminal coupled to the second terminal of the first resonant inductor L91; a second terminal coupled to the ground terminal; and a control terminal configured to receive the second control signal Sc2.

In operation, the first resonant tank 103 and the second resonant tank 104 provide a voltage conversion ratio of 2 to 1, respectively, and the storage capacitor C92 provides a voltage conversion ratio of 1:1. Therefore, the RSCC 10 may provide a voltage conversion ratio of 4 to 1. The voltage across the second resonant capacitor C93 may be 3 times the output voltage Vout, the voltage across the storage capacitor C may be twice the output voltage Vout, and the voltage across the first resonant capacitor C91 and the output capacitor Co may be equal to the output voltage Vout, respectively. In some embodiments, the storage capacitor C92 may also be connected in series with the inductor to form another resonant tank.

In the first state, the first set of switches 101 and the second set of switches 102 may be configured to couple the first terminal of the second resonant capacitor C93 to the input terminal 14, couple the second terminal of the first resonant inductor L91 to the second terminal of the second resonant inductor L92, couple the first terminal of the storage capacitor C92 to the first terminal of the first resonant capacitor C91, couple the second terminal of the storage capacitor C92 to the ground terminal, and couple the first terminal of the output capacitor Co to the second terminal of the first resonant inductor L91 and the second terminal of the second resonant inductor L92. The second resonant capacitor C93 and the output capacitor Co may be charged, and the storage capacitor C92 may discharge the first resonant capacitor C91 and the output capacitor Co.

In the second state, the first set of switches 101 and the second set of switches 102 may be configured to couple the first terminal of the output capacitor Co is coupled to the first terminal of the first resonant capacitor C91 and the second terminal of the storage capacitor C92, couple the second terminal of the first resonant inductor L91 to the ground terminal, couple the first terminal of the second resonant capacitors C93 to the first terminal of the storage capacitor C92, and couple the second terminal of the first resonant inductor L91 to the ground terminal. The first resonant capacitor C91 may discharge the output capacitor Co, and the second resonant capacitor C93 may discharge the storage capacitor C92 and the output capacitor Co.

The RSCC 10 may alternately switch between the first state and the second state to continuously charge and discharge all capacitors in the RSCC 10 to maintain a charge balance, while transferring power from the input terminal 14 to the output terminal 16 to generate the output voltage Vout.

Figure 10:
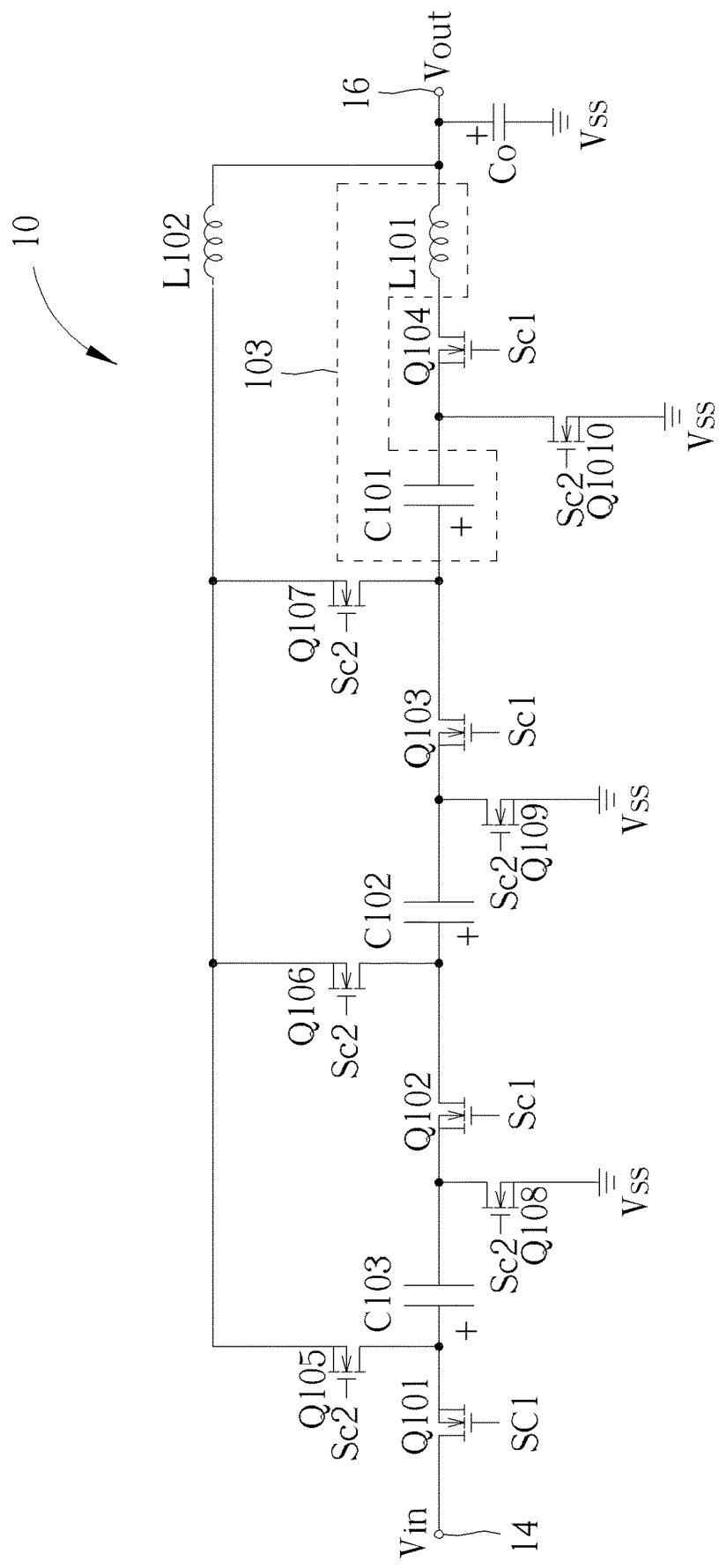
FIG. 10 is a circuit schematic of the resonant switched-capacitor converter according to another embodiment of the invention.

FIG. 10 is a circuit schematic of the resonant switched-capacitor converter according to another embodiment of the invention. The resonant switching capacitor converter 10 in FIG. 10 may replace the resonant switching capacitor converter 10 in FIG. 2. In FIG. 10, the RSCC 10 may include a first resonant tank 103, a second resonant capacitor C102, a third resonant capacitor C103, an output capacitor Co, and transistors Q101 to Q1010. The transistors Q101 to Q1010 may be, but are not limited to, N-type MOSFETs.

The second resonant capacitor C102 has a first terminal and a second terminal. The third resonant capacitor C103 has a first terminal and a second terminal. The first resonant tank 103 includes a first resonant capacitor C101 and a first resonant inductor L101. The first resonant capacitor C101 has a first terminal and a second terminal. The first resonant inductor L101 has a first terminal; and a second terminal coupled to the first terminal of the output capacitor Co. The output capacitor Co has a first terminal configured to generate the output voltage Vout; and a second terminal coupled to the ground terminal.

The transistors Q101 to Q104 may form a first set of switches 101. The transistor Q101 has a first terminal coupled to the input terminal 14; a second terminal coupled to the first terminal of the third resonant capacitor C103; and a control terminal configured to receive the first control signal Sc1. The transistor Q102 has a first terminal coupled to the second terminal of the third resonant capacitor C103; a second terminal coupled to the first terminal of the second resonant capacitor C102; and a control terminal configured to receive the first control signal Sc1. The transistor Q103 has a first terminal coupled to the second terminal of the second resonant capacitor C102; a second terminal coupled to the first terminal of the first resonant capacitor C101; and a control terminal configured to receive the first control signal Sc1. The transistor Q104 has a first terminal coupled to the second terminal of the first resonant capacitor C101; a second terminal coupled to the first terminal of the first resonant inductor L101; and a control terminal configured to receive the first control signal Sc1.

The transistors Q105 to Q1010 may form a second set of switches 102. The transistor Q105 has a first terminal coupled to the first terminal of the second resonant inductor L102; a second terminal coupled to the first terminal of the third resonant capacitor C103; and a control terminal configured to receive the second control signal Sc2. The transistor Q106 has a first terminal coupled to the first terminal of the second resonant inductor L102; a second terminal coupled to the first terminal of the second resonant capacitor C102; and a control terminal configured to receive the second control signal Sc2. The transistor Q107 has a first terminal coupled to the first terminal of the second resonant inductor L102; a second terminal coupled to the first terminal of the first resonant capacitor C101; and a control terminal configured to receive the second control signal Sc2. The transistor Q108 has a first terminal coupled to the second terminal of the third resonant capacitor C103; a second terminal coupled to the ground terminal; and a control terminal configured to receive the second control signal Sc2. The transistor Q109 has a first terminal coupled to the second terminal of the second resonant capacitor C102; a second terminal coupled to the ground terminal; and a control terminal configured to receive the second control signal Sc2. The transistor Q1010 has a first terminal coupled to the second terminal of the first resonant capacitor C101; a second terminal coupled to the ground terminal; and a control terminal configured to receive the second control signal Sc2.

In operation, the input voltage Vin may be 4 times the output voltage Vout, and the voltage across the third resonant capacitor C103, the second resonant capacitor C102, the first resonant capacitor C101, and the output capacitor Co may be equal to the output voltage Vout, respectively, providing a voltage conversion ratio of 4 to 1 of the RSCC 10.

In the first state, the first set of switches 101 and the second set of switches 102 may be sequentially coupled to the third resonant capacitor C103, the second resonant capacitor C102, the first resonant capacitor C101, the first resonant inductor L101, and the output capacitor Co between the input terminal 14 and the ground terminal. The first resonant capacitor C101 may charge the output capacitor Co.

In the second state, the first set of switches 101 and the second set of switches 102 may couple the first terminal of the output capacitor Co to the second terminal of the second resonant inductor L102, and parallel-couple the first resonant capacitor C101, the second resonant capacitor C102, and the third resonant capacitor C103. The first resonant capacitor C101, the second resonant capacitor C102, and the third resonant capacitor C103 may discharge the output capacitor Co. The RSCC 10 may alternately switch between the first state and the second state to continuously charge and discharge all capacitors in the RSCC 10 to maintain a charge balance, while transferring power from the input terminal 14 to the output terminal 16 to generate the output voltage Vout.

The present invention is not limited to the RSCC with a voltage conversion ratio of 4:1, those skilled in the art would recognize that the RSCC in the embodiments may adopt other voltage conversion ratios or other forms of switched-capacitor converters (SCC) on the basis of the principle of the invention.

The embodiments of FIGS. 1, 2, 4, and 8-10 adjust the first control signal Sc1 and the second control signal Sc2 according to the output voltage Vout to regulate the output voltage Vout, providing overvoltage protection without greatly increasing the circuit area.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A direct current-direct current (DC-DC) power conversion system comprising:
an input terminal configured to receive an input voltage;
a resonant switched-capacitor converter configured to receive the input voltage and switching between a first state and a second state to generate an output voltage, the resonant switched-capacitor converter comprising:
a first resonant tank;
an output capacitor having a first terminal configured to generate the output voltage; and a second terminal coupled to a ground terminal;
a first set of switches coupled to the first resonant tank and the output capacitor, and configured to be turned on in the first state and turned off in the second state according to a first control signal; and
a second set of switches coupled to the first resonant tank and the output capacitor, and configured to be turned on in the second state and turned off in the first state according to a second control signal;
an output terminal coupled to the output capacitor, and configured to output the output voltage; and
a controller coupled to the first set of switches and the second set of switches, and configured to adjust the first control signal according to the output voltage to control a first ON time of the first set of switches, and adjust the second control signal according to the output voltage to control a second ON time of the second set of switches, the controller comprising:
a voltage divider coupled to the first terminal of the output capacitor, and configured to generate a divided voltage of the output voltage;
a first comparison circuit coupled to the voltage divider, and configured to compare the divided voltage to a reference voltage to generate a first comparison voltage;
a second comparison circuit coupled to the first comparison circuit, and configured to compare the first comparison voltage to a ramp voltage to generate a second comparison voltage;
a first AND gate coupled to the second comparison circuit, and configured to perform an AND operation on the second comparison voltage and a clock signal to generate a control signal;
a flip-flop coupled to the first AND gate, and configured to generate an output signal and an inverted output signal according to the control signal;
a second AND gate coupled to the flip-flop, and configured to perform an AND operation on the control signal and the output signal to generate the first control signal; and
a third AND gate coupled to the flip-flop, and configured to perform an AND operation on the control signal and the inverted output signal to generate the second control signal.

2. The DC-DC power conversion system of claim 1, wherein in the first state, the first set of switches is configured to serial-connect the first resonant tank between the input terminal and the output capacitor.

3. The DC-DC power conversion system of claim 1, wherein in the second state, the second set of switches is configured to connect the first resonant tank and the output capacitor in parallel.

4. The DC-DC power conversion system of claim 1, wherein the controller is configured to alternately switch the resonant switched-capacitor converter between the first state and the second state.

5. The DC-DC power conversion system of claim 1, wherein the first ON time is less than a first OFF time of the first set of switches, and the second ON time is less than a second OFF time of the second set of switches.

6. The DC-DC power conversion system of claim 1, wherein a length of the first ON time is equal to a length of the second ON time.

7. The DC-DC power conversion system of claim 1, wherein:
the first resonant tank comprises:
a first resonant capacitor having a first terminal and a second terminal; and
a first resonant inductor having a first terminal; and a second terminal coupled to the first terminal of the output capacitor;
the resonant switched-capacitor converter further comprises a second resonant tank, the second resonant tank comprising:
a second resonant capacitor having a first terminal and a second terminal; and
a second resonant inductor having a first terminal; and a second terminal coupled to the first terminal of the output capacitor;
the first set of switches comprising:
a first transistor having a first terminal; a second terminal coupled to the first terminal of the first resonant capacitor; and a control terminal configured to receive the first control signal;
a second transistor comprising a first terminal coupled to the second terminal of the first resonant capacitor, a second terminal coupled to the first terminal of the first resonant inductor; and a controller configured to receive the first control signal;
a third transistor having a first terminal coupled to the first terminal of the second resonant inductor; a second terminal coupled to the first terminal of the second resonant capacitor; and a control terminal configured to receive the first control signal; and
a fourth transistor having a first terminal coupled to the second terminal of the second resonant capacitor; a second terminal coupled to the ground terminal; and a control terminal configured to receive the first control signal; and
the second set of switches comprising:
a fifth transistor having a first terminal coupled to the first terminal of the first resonant inductor; a second terminal coupled to the first terminal of the first resonant capacitor; and a control terminal configured to receive the second control signal;
a sixth transistor having a first terminal coupled to the second terminal of the first resonant capacitor; a second terminal coupled to the ground terminal; and a control terminal configured to receive the second control signal;
a seventh transistor having a first terminal coupled to the first terminal of the second resonant capacitor; a second terminal; and a control terminal configured to receive the second control signal; and an eighth transistor having a first terminal coupled to the second terminal of the second resonant capacitor; a second terminal coupled to the first terminal of the second resonant inductor; and a control terminal configured to receive the second control signal.

8. The DC-DC power conversion system of claim 1, wherein:

the first resonant tank comprises:
- a first resonant capacitor having a first terminal and a second terminal; and
- a first resonant inductor having a first terminal coupled to the second terminal of the first resonant capacitor; and a second terminal;

the resonant switched-capacitor converter further comprises a second resonant tank, the second resonant tank comprising:
- a second resonant capacitor having a first terminal and a second terminal; and
- a second resonant inductor having a first terminal coupled to the second terminal of the second resonant capacitor, and a second terminal;

the first set of switches comprising:
- a first transistor having a first terminal; a second terminal coupled to the first terminal of the first resonant capacitor; and a control terminal configured to receive the first control signal;
- a second transistor having a first terminal coupled to the second terminal of the first resonant inductor, a second terminal coupled to the first terminal of the output capacitor; and a controller configured to receive the first control signal;
- a third transistor having a first terminal coupled to the first terminal of the output capacitor; a second terminal coupled to the first terminal of the second resonant capacitor; and a control terminal configured to receive the first control signal; and
- a fourth transistor having a first terminal coupled to the second terminal of the second resonant inductor; a second terminal coupled to the ground terminal; and a control terminal configured to receive the first control signal; and the second set of switches comprising:
- a fifth transistor having a first terminal coupled to the first terminal of the output capacitor; a second terminal coupled to the first terminal of the first resonant capacitor; and a control terminal configured to receive the second control signal;
- a sixth transistor having a first terminal coupled to the second terminal of the first resonant inductor; a second terminal coupled to the ground terminal; and a control terminal configured to receive the second control signal;
- a seventh transistor having a first terminal coupled to the first terminal of the second resonant capacitor; a second terminal; and a control terminal configured to receive the second control signal; and
- an eighth transistor having a first terminal coupled to the second terminal of the second resonant inductor, a second terminal coupled to the first terminal of the output capacitor; and a control terminal configured to receive the second control signal.

9. The DC-DC power conversion system of claim 1, wherein:

the first resonant tank comprises:
- a first resonant capacitor having a first terminal and a second terminal; and
- a first resonant inductor having a first terminal coupled to the second terminal of the first resonant capacitor; and a second terminal;

the resonant switched-capacitor converter further comprises a storage capacitor having a first terminal and a second terminal;

the first set of switches comprising:
- a first transistor having a first terminal coupled to the first terminal of the storage capacitor; a second terminal coupled to the first terminal of the first resonant capacitor; and a control terminal configured to receive the first control signal; and
- a second transistor having a first terminal coupled to the second terminal of the first resonant inductor, a second terminal coupled to the first terminal of the output capacitor; and a controller configured to receive the first control signal; and
- a third transistor having a first terminal coupled to the second terminal of the storage capacitor; a second terminal coupled to the ground terminal; and a control terminal configured to receive the first control signal; and the second set of switches comprising:
- a fourth transistor comprising a first terminal coupled to the first terminal of the first resonant capacitor, a second terminal coupled to the first terminal of the output capacitor; and a controller configured to receive the second control signal;
- a fifth transistor having a first terminal coupled to the second terminal of the first resonant inductor; a second terminal coupled to the ground terminal; and a control terminal configured to receive the second control signal;
- a sixth transistor having a first terminal; a second terminal coupled to the first terminal of the storage capacitor; and a control terminal configured to receive the second control signal; and
- a seventh transistor having a first terminal coupled to the second terminal of the storage capacitor; a second terminal coupled to the first terminal of the output capacitor; and a control terminal configured to receive the second control signal.

10. The DC-DC power conversion system of claim 1, wherein:

the first resonant tank comprises:
- a first resonant capacitor having a first terminal and a second terminal; and
- a first resonant inductor having a first terminal; and a second terminal coupled to the first terminal of the output capacitor;

the resonant switching capacitor converter further comprises:
- a second resonant capacitor having a first terminal and a second terminal; and
- a second resonant inductor having a first terminal; and a second terminal coupled to the first terminal of the output capacitor;

the first set of switches comprising:
- a first transistor having a first terminal coupled to the second terminal of the second resonant capacitor; a second terminal coupled to the first terminal of the first resonant capacitor; and a control terminal configured to receive the first control signal;
- a second transistor having a first terminal coupled to the second terminal of the first resonant capacitor, a second terminal coupled to the first terminal of the first resonant inductor; and a controller configured to receive the first control signal; and a third transistor having a first terminal; a second terminal coupled to the first terminal of the second resonant capacitor; and a control terminal configured to receive the first control signal; and the second set of switches comprising:

a fourth transistor having a first terminal coupled to the first terminal of the second resonant inductor; a second terminal coupled to the first terminal of the first resonant capacitor; and a control terminal configured to receive the second control signal;

a fifth transistor having a first terminal coupled to the second terminal of the first resonant capacitor; a second terminal coupled to the ground terminal; and a control terminal configured to receive the second control signal;

a sixth transistor having a first terminal; the first terminal coupled to the second resonance inductor; a second terminal coupled to the first terminal of the second resonant capacitor; and a control terminal configured to receive the second control signal; and a seventh transistor having a first terminal coupled to the second terminal of the second resonant capacitor; a second terminal coupled to the ground terminal; and a control terminal configured to receive the second control signal.

11. The DC-DC power conversion system of claim 1, wherein a ratio of the input voltage to the output voltage is greater than 2 to 1.

12. The DC-DC power conversion system of claim 1, wherein the first ON time and the second ON time are equal to a predetermined ON time, and the predetermined ON time is 0% duty cycle.

\* \* \* \* \*